United States Patent [19]

Graber et al.

[11] Patent Number: 5,967,624
[45] Date of Patent: Oct. 19, 1999

[54] PROCESS OF OPERATING AN ANTI-LOCK MOTOR VEHICLE BRAKE SYSTEM

[75] Inventors: Johannes Graber, Eschborn; Nino Romano, Frankfurt am Main, both of Germany

[73] Assignee: ITT Manufacturing Enterprises Inc., Wilmington, Del.

[21] Appl. No.: 08/875,542

[22] PCT Filed: Jan. 30, 1996

[86] PCT No.: PCT/EP96/00350

§ 371 Date: Sep. 25, 1997

§ 102(e) Date: Sep. 25, 1997

[87] PCT Pub. No.: WO96/23680

PCT Pub. Date: Aug. 8, 1996

[30] Foreign Application Priority Data

Feb. 1, 1995 [DE] Germany .......................... 195 03 076

[51] Int. Cl.⁶ .................................................. B60T 8/34
[52] U.S. Cl. ........................................ 303/113.4; 303/155
[58] Field of Search ............................. 303/113.4, 155, 303/163, 164, DIG. 1, DIG. 2

[56] References Cited

U.S. PATENT DOCUMENTS

| | | | |
|---|---|---|---|
| 3,382,012 | 5/1968 | Lucien | 303/155 |
| 4,606,586 | 8/1986 | Eckert et al. | 303/155 |
| 4,671,576 | 6/1987 | Fourie | 303/155 |
| 4,812,777 | 3/1989 | Shirai | 303/14 |
| 5,147,114 | 9/1992 | Hommen et al. | 303/DIG. 2 |
| 5,281,011 | 1/1994 | Yoshino et al. | 303/113.4 |
| 5,470,136 | 11/1995 | Tozu et al. | 303/113.4 |
| 5,558,409 | 9/1996 | Walenty et al. | 303/113.4 |
| 5,575,543 | 11/1996 | Pheonix | 303/155 |

FOREIGN PATENT DOCUMENTS

| | | |
|---|---|---|
| 265623 | 5/1988 | European Pat. Off. . |
| 3928649 | 3/1991 | Germany . |
| 4003579 | 6/1991 | Germany . |
| 4003957 | 8/1991 | Germany . |
| 4022671 | 1/1992 | Germany . |
| 4029793 | 3/1992 | Germany . |
| 4030724 | 4/1992 | Germany . |
| 4208496 | 8/1993 | Germany . |
| 4232311 | 2/1994 | Germany . |
| 4329140 | 12/1994 | Germany . |
| 4322182 | 1/1995 | Germany . |
| WO 92/18361 | 10/1992 | WIPO . |
| WO 96/23680 | 8/1996 | WIPO . |

*Primary Examiner*—Robert J. Oberleitner
*Assistant Examiner*—Robert A. Siconolfi
*Attorney, Agent, or Firm*—Rader, Fishman & Grauer PLLC

[57] ABSTRACT

In a method of operating an anti-lock automotive vehicle brake system for driving stability control and/or traction slip control (DSC/TCS) which includes an actuating unit that is operable by a brake pedal, and the actuating travel of the brake pedal is sensed by a pedal position sensor, a pressure value is assigned to the output signal of the pedal position sensor (11) in a control operation, the pressure value corresponding to the hydraulic pressure which prevails in the brake circuit (I of II) that is pressurized in response to the driver's wish.

3 Claims, 1 Drawing Sheet

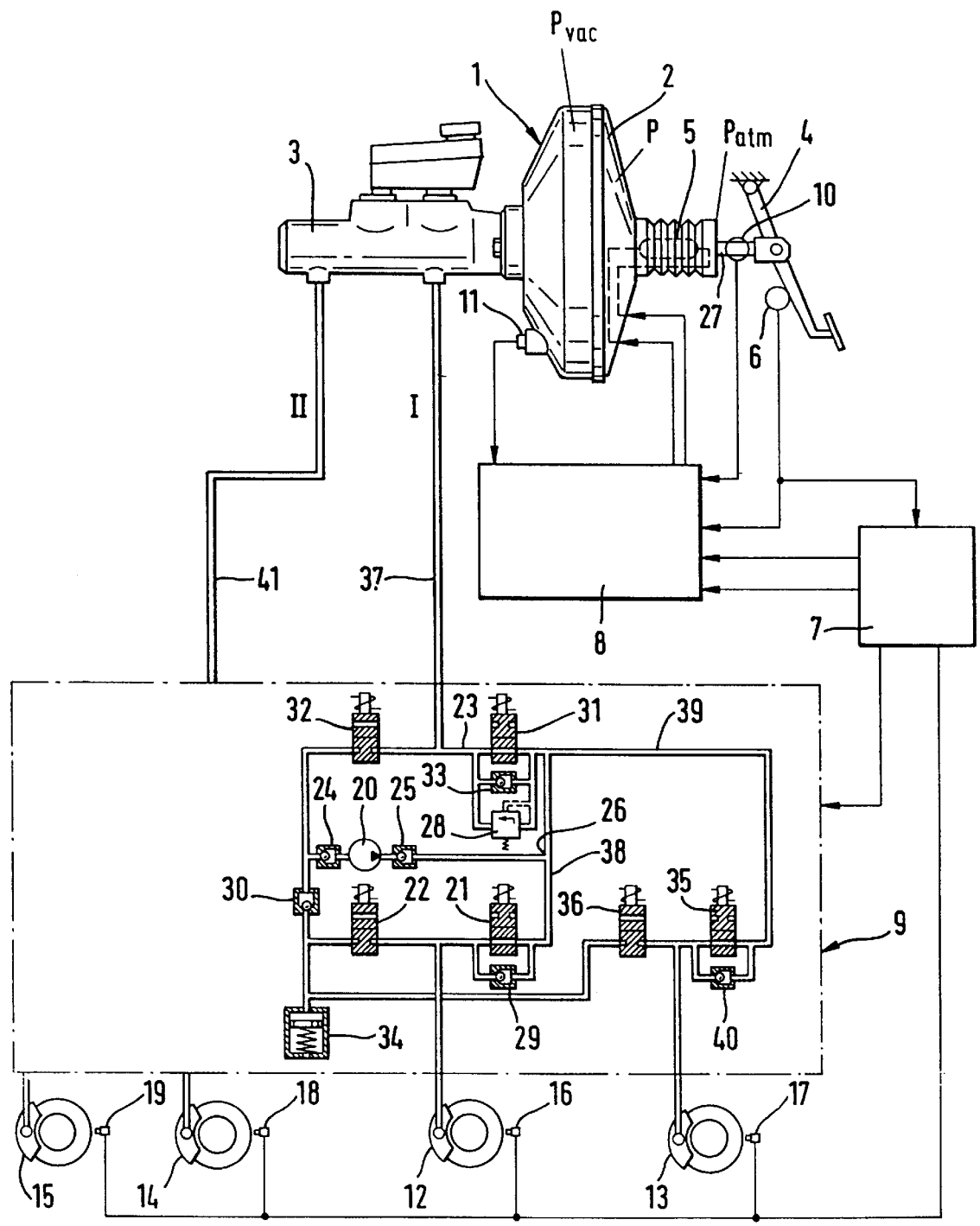

PROCESS OF OPERATING AN ANTI-LOCK MOTOR VEHICLE BRAKE SYSTEM

The present invention relates to a method of operating an anti-lock automotive vehicle brake system for driving stability control and/or traction slip control having an actuating unit which includes a dual-circuit master brake cylinder operable by a brake pedal, brake circuits associated with the individual vehicle wheels which are connected to pressure chambers of the master brake cylinder, valve assemblies of a hydraulic unit with a return pump which are interposed in the brake circuits, wherein, in a control operation, hydraulic pressure can be built up in each of the brake circuits by way of the return pump irrespective of the driver's wish, and wherein a pedal position sensor is provided which determines the actuating travel of the brake pedal and the output signal of which is sent to an electronic control unit.

German patent No. 42 08 496 discloses a brake system, wherein the brake force booster interacts with a solenoid valve to achieve automatically controlled braking operations along with a great deceleration of the vehicle. The solenoid valve permits an enhanced use of the braking pressure upon quick application of the brake pedal. A brake pedal position sensor, a brake light switch, and a force sensor which permits detection of the driver's wish for deceleration are provided to achieve the above-mentioned braking pressure control concept. Further, the known brake system includes an anti-lock control system (ABS) which ensures a stable deceleration behavior of the vehicle during braking operations.

However, the mentioned publication does not give any specific hints as to how the brake system described could be used for driving stability control.

German patent application No. 42 32 311 discloses a hydraulic vehicle brake system with anti-lock control which, for improving the vehicle tracking stability, in particular when cornering, includes an auxiliary pressure source which is used to prefill the vehicle wheel brakes and to precharge the return pump. The auxiliary pressure source, which is provided by parallel connection of an auxiliary pump, a restrictor and an auxiliary pressure limiting valve, is connected to an inlet port of each one hydraulic cylinder. The hydraulic cylinder is connected to the connection between the outlet of an actuating unit, comprising a brake force booster and a master cylinder inserted after the booster, and the ABS hydraulic unit or the wheel brake. A second inlet of the cylinder is connected to the master brake cylinder. The cylinder accommodates a separating piston which can be acted upon by the auxiliary pressure. The separating piston accommodates a valve which is open in its inactive position and permits a connection between the master brake cylinder and the wheel brake. When the auxiliary pump is started, the separating piston is displaced, with the result that the valve shuts off the above-mentioned connection and the pressure fluid conducted by the separating piston causes prefilling of the wheel brakes and precharging of the return pump. A signal representative of the pressure desired by the driver is supplied by a pressure sensor which is connected to the first pressure chamber of the master cylinder.

A disadvantage in the prior art arrangement, however, is the comparatively high technical expenditure needed when using the pressure sensor to achieve the known method.

Therefore, an object of the present invention is to disclose a method of operating an anti-lock automotive vehicle brake system of the type referred to hereinabove which can be achieved in a simple manner and at low cost by using the components which are already provided in the brake system. In particular, the need for the complicated pressure sensor shall be eliminated.

This object is achieved according to the present invention in that, in a control operation, a pressure value is assigned to the output signal of the pedal position sensor which corresponds to the pressure prevailing in the brake circuit that is pressurized responsive to the driver's wish.

In a preferred aspect of the present invention, monitoring the function of the pedal position sensor is achieved by comparing the pressure value with a second pressure value which is determined from the deceleration occurring on the vehicle wheel and from the wheel slip.

BRIEF DESCRIPTION OF THE DRAWINGS

The present invention will be described in detail in the following text by way of an embodiment, making reference to the accompanying drawing. In the drawing, the only FIGURE refers to a design of an anti-lock automotive vehicle brake system which permits implementing the method of the present invention.

The brake system of the present invention used to implement the method of the present invention, as shown, includes two brake circuits I and II having a completely identical design. Thus, the following description of one brake circuit also applies to the other brake circuit. The brake system shown generally includes an actuating unit 1, an electronic control unit 8, wheel brakes 12, 13, 14, 15, a DSC/TCS hydraulic unit or pressure modulator 9, which is arranged between the wheel brakes 12 to 15 and the actuating unit 1, and a DSC/TCS controller 7 which produces control signals for the pressure modulator 9. The wheel brake cylinders 12 to 15 are associated with the individual brake circuits I, II, for example, so that the first wheel brake cylinder pair 12, 13 is associated with one vehicle axle and the other wheel brake cylinder pair 14, 15 is associated with the other vehicle axle (black and white brake circuit split). However, a diagonal split of the brake circuits is also possible.

Associated with each of the vehicle wheels (not shown) is a wheel sensor 16, 17, 18, 19 having a control signal indicative of the wheel speed which is sent to the DSC/TCS controller 7. The actuating unit 1 includes a pneumatic brake force booster, preferably a vacuum brake force booster 2, which is operable by a brake pedal 4. A master brake cylinder 3, preferably a tandem master cylinder, is connected downstream of the brake force booster. The pressure chambers (not shown) of the tandem master cylinder 3 are connected to a pressure modulator 9 by way of hydraulic lines 37, 41. An actuating rod 27 is coupled to the brake pedal 4 permitting actuation of a control valve 5 (shown only schematically) which controls the increase of a pneumatic differential pressure in the housing of the vacuum brake force booster 2. A solenoid (not shown), operable by control signals of the electronic control unit 8, permits an independent actuation of the control valve 5 irrespective of an actuation introduced at the brake pedal 4.

A brake light switch 6 which is operatively connected to the brake pedal 4 permits identifying the actuation introduced on the brake pedal 4. The actuating travel of the brake pedal 4 is sensed by a sensor device which is preferably a travel sensor 11 of analog operation that is associated with the vacuum brake force booster 2. The travel sensor 11 emits output signals which are sent to the electronic control unit 8 and are evaluated therein, during the first interval of brake operation, as a basis of decision for the active brake management. Preferably, the travel sensor can be configured as a linear potentiometer.

An electric switching device 10 (which is shown only schematically in FIG. 1) is provided to ensure that the above-mentioned solenoid is reliably deactivated after termination of the braking operation assisted by independent force.

The above-mentioned DSC/TCS hydraulic unit 9 includes a motor-and-pump assembly having a hydraulic return pump 20 driven by an electric motor (not shown). The suction side of the return pump is connected to the first pressure chamber of the master brake cylinder 3 by way of a first non-return valve 24 and an electromagnetically operable switch valve 32. The pressure fluid flows from the pressure side of the return pump 20 to a hydraulic junction 26 by way of a second non-return valve 25 and a damping chamber (not shown). A line portion 38 leading to the first wheel brake cylinder 12 and a line portion 39 leading to the second wheel brake cylinder 13 is connected to junction 26. A hydraulic line 23 connects the pressure side of the return pump 20 to the tandem master cylinder 3. Further, a preferably electromagnetically operable separating valve 31 is interposed between the junction 26 and the master brake cylinder 3. Connected in parallel to the separating valve 31 is a third non-return valve 33 and a pressure-limiting valve 28. For the modulation of the pressure introduced into the first wheel brake cylinder 12, an inlet valve 21, connected in parallel with a fourth non-return valve 29, and an outlet valve 22 is used, the parallel connected valves being inserted into the line portion 38, and the outlet valve 22 permitting a connection between the first wheel brake cylinder 12 and a low-pressure accumulator 34 for a reduction of the wheel braking pressure. Low-pressure accumulator 34 is connected to the suction side of the return pump 20 by way of a fifth non-return valve 30.

A second parallel connection of a second inlet valve 35 with a sixth non-return valve 40 and a second outlet valve 36 is provided to control the hydraulic pressure introduced into the second wheel brake cylinder 13 associated with the brake circuit at topic, which is similar to the wheel brake cylinder 12 referred to hereinabove. The mentioned parallel connection is arranged in the line portion 39, and the outlet valve 36 provides a connection between the second wheel brake cylinder 13 and the low-pressure accumulator 34 for the reduction of wheel braking pressure.

During normal braking operations, pressure increase and pressure reduction in the wheel brake cylinders 12, 13 can be effected by a corresponding operation of the actuating unit 1 by way of the open separating valve 31 and the open inlet valves 21, 35.

The return pump 20 is started during ABS control operations in an imminent locked condition of the wheel associated with the wheel brake 12, for example. Both the switch valve 32 and the separating valve 31 remain unoperated. The pressure is modulated by correspondingly switching the inlet and outlet valves 21 and 22, and the pressure fluid discharged into the low-pressure accumulator 34 is returned by the return pump 20 until the pressure level of the master brake cylinder is reached.

Upon commencement of each independent assist braking operation, an information about the pressure desired by the vehicle driver is required. To this end, a pressure value is assigned to the travel information supplied by the travel sensor 11. The pressure value corresponds to the pressure prevailing in the brake circuit which is not braked "actively", i.e., whose connection with the master brake cylinder 3 during control is maintained. To permit assigning the pressure values relating to the driver's wish to the travel sensor signals, the electronic control unit 8 or the DSC/TCS controller 7 includes tables which correspond to the two brake circuits I and II and in which the above-mentioned pressure values are stored.

Appropriate monitoring of the correct functioning of the travel sensor 11 can be performed by comparing the pressure values determined from the travel sensor signals with second pressure values which are determined from the deceleration which occurs on the vehicle wheel and from wheel slip. Relevant data about the last-mentioned quantities are furnished by the individual wheel sensors 16, 17, 18 and 19 to the DSC/TCS controller 7.

In the start-up phase of the return pump 20, the brake force booster 2 is actuated during each control operation irrespective of the driver's wish so that the wheel brakes 12, 13 or 14, 15 are prefilled. The separating valve 31 is closed and the switch valve 32 is opened for further pressure increase, if necessary, in the wheel brakes 12, 13. Thus, the return pump 20 generates a high pressure at the junction 26 which is limited by the pressure-limiting valve 28. The mentioned pressure permits individually adjusting the desired independent assist braking pressure in the wheel brake cylinders 12, 13 by operation of the inlet and outlet valves 21, 35 and 22, 36. After change-over of the valves 32 and 31, the actuation of the brake force booster 2 can be removed, and the circuit which is not "actively" braked can be connected to the tandem master cylinder again.

As has been mentioned above, pressure increase occurs by way of the open inlet valves 21, 35. A pressure-maintaining period is achieved by change-over of the inlet valves 21, 35, and pressure decrease occurs by change-over of the outlet valves 22, 36, with inlet valves 21, 35 still closed. The pressure variation required for the control is provided by way of pressure increase periods, pressure-maintaining periods and pressure decrease periods. The pressure fluid discharged into the low-pressure accumulator 34 is returned by the return pump 20. This is permitted by change-over of the switch valve 32 to its closed condition, where the suction side of the return pump 20 is separated from the master brake cylinder 3 until the low-pressure accumulator 34 has been emptied.

List of Reference Numerals:
1 actuating unit
2 vacuum brake force booster
3 master brake cylinder
4 brake pedal
5 control valve
6 brake light switch
7 DSC/TCS controller
8 control unit
9 pressure modulator
10 switching device
11 travel sensor
12 wheel brake cylinder
13 wheel brake cylinder
14 wheel brake cylinder
15 wheel brake cylinder
16 wheel sensor
17 wheel sensor
18 wheel sensor
19 wheel sensor
20 return pump
21 inlet valve
22 outlet valve
23 line
24 non-return valve
25 non-return valve 26 junction
27 actuating rod
28 pressure-limiting valve
29 non-return valve
30 non-return valve
31 non-return valve
32 switch valve
33 separating valve
34 low-pressure accumulator
35 inlet valve
36 outlet valve
37 line
38 line portion
3 line portion
40 non-return valve
41 line

We claim:

1. A method of operating an anti-lock automotive vehicle brake system for a driving stability control or traction slip control, having an actuating unit which includes a dual-circuit master brake cylinder operable by a brake pedal, brake circuits associated with the individual vehicle wheels which are connected to pressure chambers of the master brake cylinder, a hydraulic unit with a return pump interposed in the brake circuits, wherein, in a driving stability control or traction slip control operation, hydraulic pressure can be built up in either of the brake circuits by way of the return pump drawing brake fluid from the master cylinder irrespective of a brake pedal actuation, wherein brake fluid is subsequently returned from the brake circuits to the master brake cylinder by the return pump and wherein a pedal position sensor is provided which determines an actuating travel of the brake pedal, and an output signal of which is sent to an electronic control unit, wherein, in a driving stability control or traction slip control operation, when hydraulic pressure is built up by the return pump in one of the brake circuits while the other brake circuit is connected to the master brake cylinder, a first pressure value is assigned to the output signal of the pedal position sensor, which first pressure value corresponds to the pressure prevailing in the brake circuit that is connected to the master brake cylinder and pressurized in response to the brake pedal actuation.

2. The method of claim 1, wherein the pressure value is compared to a second pressure value which is determined from the deceleration occurring on a vehicle wheel connected to the master brake cylinder and from the wheel slip of this wheel.

3. The method of claim 2 wherein the second pressure value is used for monitoring the reliability of the first pressure value.

* * * * *